Sept. 22, 1959    J. D. RIESER    2,905,010
ELECTRICALLY OPERATED SELF-CONTAINED SPEED CHANGE MECHANISM
Filed July 15, 1955    2 Sheets-Sheet 1

INVENTOR.
BY John D. Rieser

Sept. 22, 1959      J. D. RIESER      2,905,010
ELECTRICALLY OPERATED SELF-CONTAINED SPEED CHANGE MECHANISM
Filed July 15, 1955      2 Sheets-Sheet 2
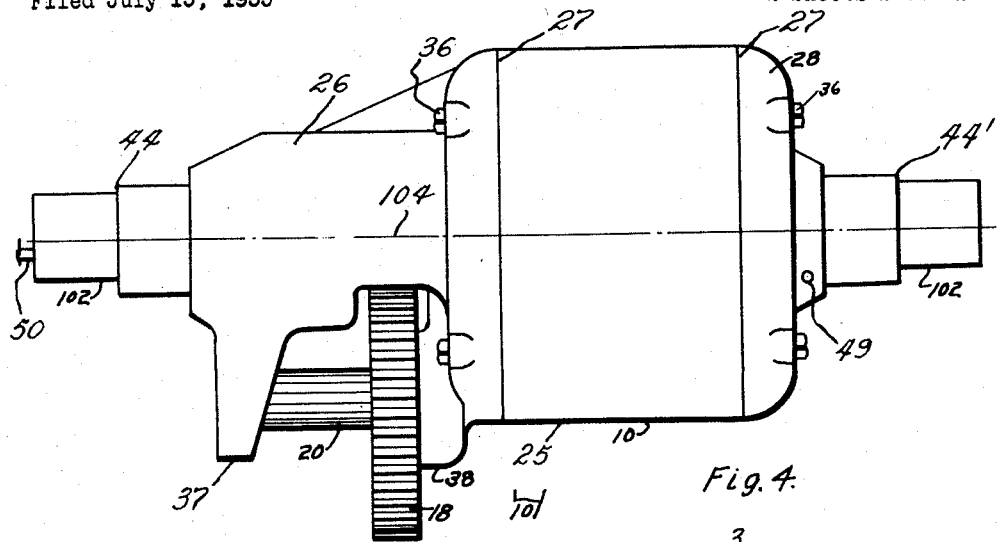
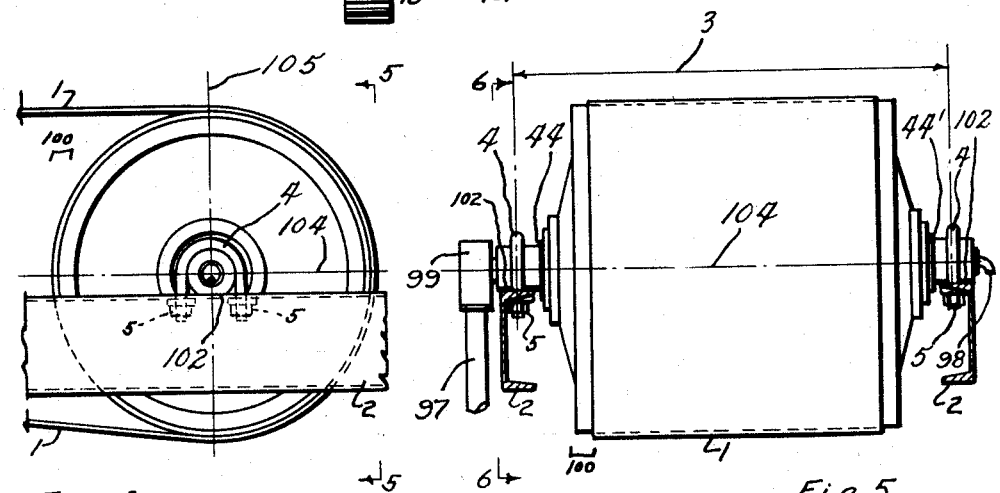
Fig. 6.      Fig. 5.
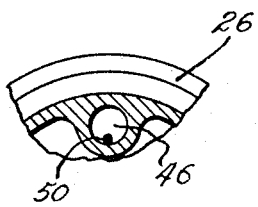
Fig. 7.
INVENTOR.
BY John D. Rieser United States Patent Office 2,905,010
Patented Sept. 22, 1959

2,905,010

ELECTRICALLY OPERATED SELF-CONTAINED SPEED CHANGE MECHANISM

John D. Rieser, San Francisco, Calif.

Application July 15, 1955, Serial No. 522,263

3 Claims. (Cl. 74—421)

This invention relates to an electrically operated self-contained speed change mechanism of the kind involving an electric motor as the prime mover drivingly coupled to a speed change gearing and together inclosed within a fluid tight housing which forms the power takeoff of the mechanism.

Heretofore motorized speed change devices, commonly referred to as motorized head pulleys have been made having the motor and the speed change gearing within the pulley or drum. And in which the end walls of the pulley or the pulley itself are perforated to permit of forced circulation of air to and from the motor. All of which inherently produces a long unit, as the speed change gearing needs to be inclosed within a fluid tight casing independent of the pulley structure and the motor having air circulating apparatus along with necessary closure components. Consequently when applied particularly as the drive unit of an ordinary belt conveyor, the axial length of such units requires that the supporting structure of the conveyor must be extended in width beyond the gauge distance of the conveyor structure, which in practice is a well established matter. Also it is a well established matter that in such devices the motor operating within such a pulley causes its temperature to rise materially beyond its prescribed range, even tho the motor is equipped with a fan to force air about same which in turn consumes power.

In my copending application Serial Number 483,275 filed January 21, 1955, now Patent No. 2,794,930 have shown a motorized speed change device involving an electric motor as the prime mover drivingly coupled to a speed change mechanism and together they are inclosed within a fluid tight housing. And in which the housing is stationary and is provided with a support means, while the speed change mechanism includes a power takeoff shaft.

It is a general broad object of the present invention to provide an improved compact self-contained motorized speed change mechanism in which a fluid tight outer housing forms the power takeoff with a fluid medium within the outer housing in contact with external portions of an electric motor that includes a fluid tight closure unit having a pair of extensions thereon which mount a pair of bearings and beyond each bearing the pair of extensions having mounting means that are adapted to rest onto a foundation while said bearings mount a pair of end walls of the outer housing with speed change gear means connecting the power takeoff and the power output shaft of the electric motor and operably the fluid medium being caused to wet exposed surfaces of the closure unit so that the fluid medium forms a major medium of transferring the heat generated by the electric motor to surfaces of the power takeoff.

Another object of the present invention is to provide a self-contained motorized speed change mechanism in which a fluid tight outer housing forms the power takeoff with a fluid medium within the outer housing in contact with external portion of an electric motor that includes a fluid tight closure unit having a pair of extensions thereon which mount a pair of bearings and beyond each of these bearings the pair of extensions having mounting means that are adapted to engage a foundation while said bearings mount a pair of end walls of the outer housing with speed change gear means connecting the power takeoff and the power output shaft of the electric motor and in which said closure unit together with said pair of extensions and the mounting means being operably coupled as a self-contained unit which forms the sole support of the power takeoff.

Another object of the present invention is to provide in the above that one of said extensions has an aperture in the form of a conduit that extends from the end of said extension into the electric motor to serve as a conduit for the lead in power wires.

Another object of the present invention is to provide in the above compactness in axial direction.

Another object of the present invention is to provide a motorized speed change mechanism of the described character of novel and simplified construction.

Other more specific objects and advantages will appear from the following description of the illustrations embodiment of the present invention.

In the drawings accompanying and forming a part hereof,

Figure 4 is an external side view similar to that of the Figure 1 showing the self-contained closure unit assembly of the fluid tight motor closure along with the pair of extension thereon and the gearing extending laterally therefrom before inserting this unit into the outer housing of Figure 1.

Figure 5 is an external side view similar to that of the Figure 1 to reduced scale, showing an application of the mechanism mounted onto an ordinary belt conveyor, taken on the line 5—5 of Figure 6.

Figure 6 is an end view in the direction of arrows 6—6 of Figure 5.

Figure 7 is a fragmentary end view, partly in section, taken on the line 7—7 of Figure 1.

Figure 1:
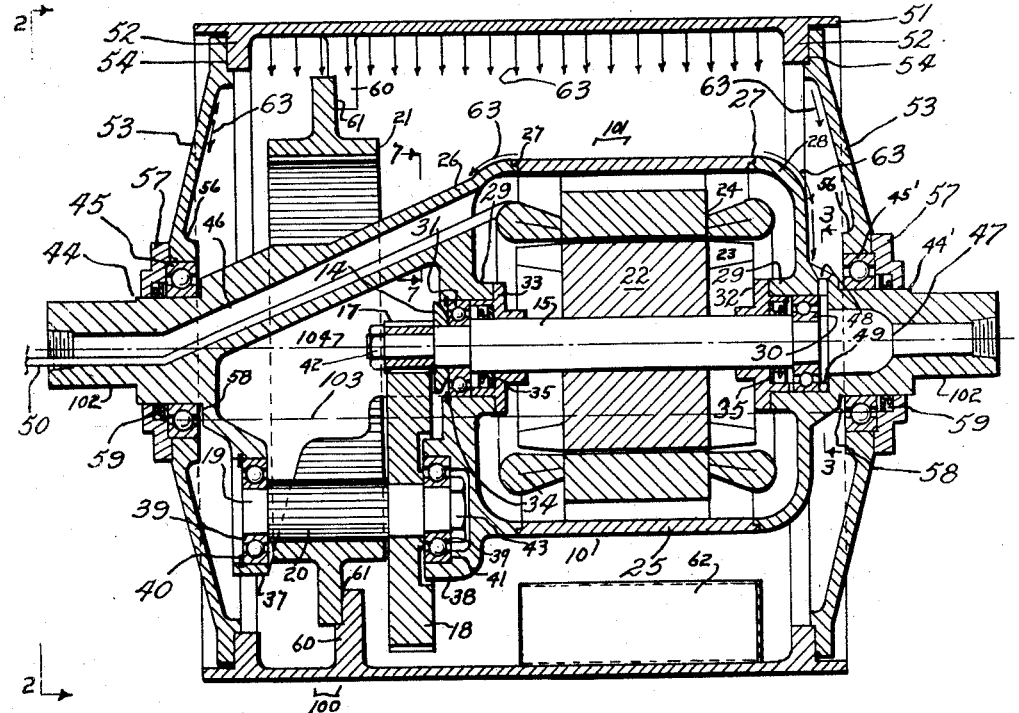
Figure 1 is a side view of my mechanism, partly in section, taken on the line 1—1 of Figure 2.

The present invention shows a preferred construction when applied for driving an endless conveyor belt or the like, however it is readily understood that the mechanism may be applied to drive endless chains or cables by changing the external contour of the power takeoff to suit.

In accordance with the objects of this invention to provide an improved compact electrically operated self-contained speed change mechanism, hereinafter referred to as the mechanism, and referring particularly to Figure 1 the mechanism generally comprises a fluid tight outer housing 100 which forms the power takeoff. It being suitably mounted for rotation on the extensions of the self-contained closure unit 101 which includes the support or mounting means 102, and a prime mover 10 which consists of an electric motor having desired electrical characteristics and a power output shaft 15, with a speed change gear means drivingly connecting the output shaft and the power takeoff and operably internally the outer housing having a suitable coolant means 103 for wetting opposite surfaces of the prime mover to that of the outer housing. And as shown Figures 5 and 6 the mechanism is mounted onto the supporting structure of the machinery being driven, which in this example, is an ordinary belt conveyor, all of which is hereinafter described. And referring to the Figures 1, 2, 3, 4, 5 and 6, the dot and dash line numbered 104 may be read as a horizontal center line, while the dot and dash line numbered 105 may be read as a vertical center line, and the dot and dash circles Figure 2 represent the pitch circles of the speed change gear means within the outer housing.

In the form Figure 1 the self-contained closure unit 101 includes the electric motor 10 which is of the round frame footless type and is of usual construction, therefore its structure is not here described. The motor output shaft 15 which is also the input shaft of the mechanism, suitably and drivingly mounts the rotor 22 and the rotor 22 may have the blades 23 projecting from each of its ends. The stator and coils 24 are fastened onto the frame 25 of the motor in usual manner. The front end of the frame 25 is fitted to and engages a correspondingly fitting thereof the front end portion of the extension 26 so as to form a fluid tight connection between the two as at 27 and held in place by a series of screws 36 (see Figure 4). And the rear end portion of the extension 28 fits and engages onto the opposite end of the frame 25 in similar manner. Thus it is readily seen that the two extensions 26 and 28 along with that of the frame 25 provides a rigid self-contained closure unit. And in which both the front and rear extensions have hubs 29 that are bored for supportably mounting the antifriction journals 30 and 31 and for the inner shank portion of the caps 32 and 33. The inner end of the shank of the cap 33 and the snap ring 34 anchor the journal 31 in axial position, as the caps 32 and 33 are fastened onto the inner face of the hubs 29 on each of the extensions 26 and 28, the fastenings are not shown. And each of the caps 32 and 33 are bored to mount the positive fluid seals 35 and for the end portions of the shaft 15 to pass therethrough. Thus even tho the outer end of the journals 30 and 31 are not covered, the simple construction described provides an inclosed fluid tight closure for the motor, that is in turn operably mounted within the outer housing 100 so as to permit of desired surfaces being wetted, as will be seen. The front end extension 26 has the hubs 37 and 38 that are bored for supportably mounting a pair of intermediate bearings 39 of which the snap ring 40 and the shoulder 41 position the axial position of the bearings 39. The bearings 39 mount the intermediate shaft 19, which in this example includes the slow speed pinion 20 that is in mesh with the slow speed or final gear 21 hereinafter described. The intermediate shaft 19 also mounts the intermediate speed gear 18 which is in mesh with the first gear or high speed pinion 17 that is mounted onto an end portion of the motor shaft 15. The locknut 42 serves to retain position of the first gear 17 together with the spacer 14 and the journal 31 on the shaft 15, while the locknut 43 serves to retain the position on the intermediate shaft 19 of the gear 18 and the bearing 38. Altho not shown, it is understood that suitable driving means are included between the gearing and their respective shafts, so that they revolve as a unit in each case. See Figures 1 and 4, with reference to the gearing it is readily seen that this gearing is not inclosed within a separate gear box, but, that a portion of same extends laterally therefrom the closure unit 101 so as to permit same of being wetted by the coolant fluid 103 when the closure unit is operatively positioned within the outer housing as will be described. This front extension 26 also includes a center hub 44 which externally mounts the bearing 45, and a continuation of this hub 44 to the left beyond the bearing 45 has a flat surface 102 which constitutes the left end mounting means as will be seen. And aperture 46 extends from the left end of the front extension 26 into the motor, which provides a conduit for the electric leadin wires 50 to the electric motor 10 (also see Figure 7). The left end of the hub 44 is internally threaded for mounting of a conduit box 99, see Figure 5. Now referring to the rear extension 28 it also has a center hub 44' which in like manner externally mounts a bearing 45' and a continuation of same, but to the right beyond this bearing 45' has a similar flat surfaces 102 which constitutes the right end mounting means. And an aperture 47 extends from the right end of the rear extension 28 to the journal 30, and to the left of the bearing 45' the hub 44' is enlarged and has an opening 48 extending vertically into the aperture 47 which operably permits of the coolant fluid 103 wetting the journal 30 as will be seen, then this portion of the hub 44' also has an opening 49 to drain off any excess coolant fluid, these openings 48 and 49 are best seen at the Figure 3. The right end of the hub 44' is threaded internally for mounting of an ordinary breather fitting or a plug as desired. And referring to the Figure 5 which indicates the application of a simple breather fitting in the form of a pipe elbow 98 which includes a proper filter medium and shielded opening that are not shown. The Figure 4 shows an external view of the self-contained closure unit 101 hereinabove described, less the bearing 45 and 45', but otherwise ready to be inserted as a unit into the outer housing 100 and on the other hand withdrawn from the outer housing as a unit and wherein all the gears may be inspected without having to dismantle same in any way.

Figure 2:
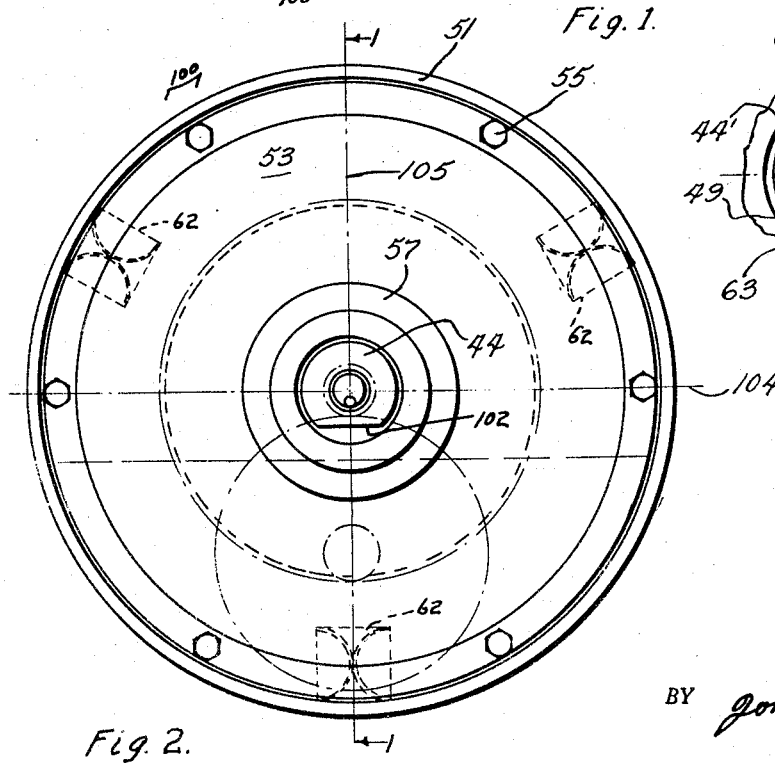
Figure 2 is an end view, viewing in the direction of arrows 2—2 of Figure 1.
Figure 3:
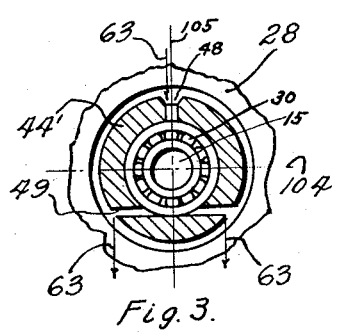
Figure 3 is a fragmentary end view, partly in section, taken on the line 3—3 of Figure 1, showing the fluid passage holes to and from the motor rear journal.

Referring to the Figures 1 and 2 the outer housing 100 is formed of a cylindrical portion 51 having externally a smooth face when driving a flat belt or the like and internally in adjacency to each end, has the flanges 52 to which are suitably fastened the end walls 53 so as to form a fluid tight connection between the two as at 54 and being held together by a series of screws 55. Then each of these end walls 53 have a hub 56 which is bored for the outer race of the bearings 45 and 45', the caps 57 are fastened onto the hubs 56 in suitable manner to serve as a retainer for said bearings, while the shoulders 58 thereof the enlarged portion of the center hubs 44 and 44' serve to position the outer housing 100 thereon the closure unit 101. The caps 57 are fitted and provided with the positive seals 59 so as to prevent leakage of the coolant fluid therefrom the outer housing. Then intermediate of the flanges 52 the cylindrical portion 51 includes a series of lugs 60 (only two being shown) which are suitably fitted as at 61 for coupling thereto of the final gear 21, which is correspondingly fitted to maintain a fixed axial alignment between the outer housing 100 and the final gear 21. The fastenings between the final gear 21 and the lugs 60 are not shown. The final gear 21 being in mesh with the slow speed pinion 20, that is as described, a part of the closure unit 101, which includes the mounting means 102 that is adapted to rest on a foundation or fixed portion of the driven machinery, consequently operably the closure unit as a whole does not rotate upon operation of the motor 10, however due to the intermediate gearing connecting the first gear 17 and the final gear 21 causes rotation of the outer housing 100 due to the coupling between the lugs 60 and the final gear. And due to the inherent capillary phenomena between the coolant fluid and the inner surfaces of the outer housing 100 causes a continuous lifting of a portion of said fluid to a height where inherently gravity forces overcomes said phenomena, whereupon the coolant fluid falls and flows about the exposed surfaces within the outer housing and thus causing wetting of all said exposed surfaces including all the bearings and journals. Then after causing said wetting the coolant fluid returns to the coolant fluid pool, consequently the process is repeated continuously during the entire operating period of the mechanism. And said process automatically effects cooling of the electric motor 10 by the coolant fluid transferring the heat generated by the electric motor 10 to the outer housing 100, which has greater surface area so as to permit of dissipation of said transferred heat to the atmosphere in an ordinary manner, which in this example is assisted by the outer housing being the rotating member. And to increase the external surface area of the outer housing, the end walls can readily be provided with fins without increasing the overall axial length of the self-contained mechanism, altho these fins are not shown. The gearing that extends into the coolant fluid also causes its being circulated in same manner as is the established practice in the prior art, therefore same does not entail power consumption over the common practice heretofore used. However the matter of forcing air into a revolving pulley structure and thence through an electric motor structure to form its major cooling means definitely causes consumption of power as well as involving greater temperature rise in the motor. It is a well known matter that a suitable fluid is the more efficient medium in effecting the transfer of heat from one body to another body, therefore less volume is required and with less operating temperature rise of the motor structure. Also as the electric motor 10 is entirely within the outer housing 100 in contact with the coolant fluid 104 eliminates the need of outside air circulation apparatus and closure parts at the ends of the electric motor, all of which permits of shortening the axial length of the mechanism. Again referring to the Figures 1 and 2, intermediate of the flanges 52 within the outer housing, have shown the inclusion of a series of lifters 62 that are attached to the inner surface of the cylindrical portion 51 in suitable manner so that they rotate with the power takeoff and elevate a portion of the coolant fluid and discharge same therefrom so that it spills onto the exposed surfaces within the outer housing. This is feasible as the outer housing operates at a low speed. The arrowed lines 63 represent generally the flow of the coolant fluid and it will be noted that part of same enters the opening 48, thus wetting the journal 30, thence passing out through the opening 49.

In electric motor practice, matters concerning the generation of heat upon operation of an electric motor are well known therefore detail matters concerning same are here omitted.

It is realized in so far as the speed change gearing is concerned, that in place of the final gear being of the internal type same could readily be of the external type in ring form so as to permit of a portion of the closure unit passing therethrough in similar manner to that shown in Figure 1.

Now referring to the Figures 5 and 6 showing to reduced scale an application of the electric operated self-contained speed change mechanism Figure 1, as the drive for an ordinary flat belt conveyor. The conveyor belt 1, drivingly extends about a portion of the external circumference of the power takeoff or outer housing 100 and the numeral 2 represents the ordinary conveyor stringers, which are in the form of structural channels and in this example, they form the foundation onto which the mounting means 102 rest or engage and prevent rotation of the closure unit 101. And the numeral 3 represents the gauge distance of the conveyor stringers and as heretofore mentioned this gauge distance in practice is a well established matter or standard. Then in installing the mechanism after same has been properly aligned in usual manner, a pair of ordinary U-bolts 4 or the like are extended about a portion of the hubs 44 and 44' the ends of the U-bolts 4 which are threaded extend through the top flange of the conveyor stringers 2, whereupon the nuts 5 are screw threaded onto the ends of each of said U-bolts to clamp the hubs onto said top flange of each conveyor stringer. The conduit box 99 with the conduit 97 being installed in the usual manner so as to inclose the electric wires completes the installation.

Various changes may be made in the embodiment of the invention hereinabove specifically described without departing from or sacrificing the advantages of the invention as defined in the appended claims.

I claim:

1. An electrically operated self-contained speed change mechanism comprising an outer housing which forms the power takeoff, said housing having a first and a second end wall confining a fluid within said housing, a final gear within said housing operably coupled to said housing, an electric motor, said motor being disposed within said housing and having a fluid tight closure with a power output shaft journally supported by said closure, the normal level of said fluid extending below the diameter of said shaft, said shaft mounting a first gear, a first and a second extension as a part of said closure and extending axially therefrom, said first extension extending through said first end wall with a bearing thereon journally mounting said first end wall, said second extension extending through said second end wall with a bearing thereon journally mounting said second end wall, said first extension mounting gearing connecting said first gear and the final gear to drive the final gear from the first gear, a portion of said gearing and said closure extending into said fluid, the end portion of each said extension axially beyond said end walls including a pad portion, so that said pad portions together with said end portions forms the mounting means for said mechanism, said mounting means adapted to prevent relative rotation of said closure upon operation of said motor by, having a surface normally parallel to the axis of the power takeoff for engaging a foundation, and said first extension including an aperture, said aperture extending from said end portion into said motor in the form of a conduit to seal the leadin wires to said motor from said fluid.

2. An electrically operable self-contained speed change mechanism comprising an external housing which forms the power takeoff, said housing having a first and a second end wall, forming a fluid inclosure within said power takeoff, a final gear within said inclosure operably coupled to said power takeoff, an electric motor, said motor having a frame with open ends, a first and a second extension projecting axially oppositely to one another fixedly attached to said ends and forming closure for said ends with a power output shaft journally supported by said first and second extension, said shaft mounting a first gear, said first and second extension and said frame forming a fluid tight closure for said motor and, forming a continual self-contained unit, in which the outer end part of each said extension including a pad portion, at least one said extension operably mounting a speed change gearing, said speed change gearing extending annularly beyond said closure, externally each said extension mounting a bearing for said first and second end wall, a lubricant fluid medium confined within said inclosure, and in which the normal level of said fluid within said inclosure extending below the diameter of said shaft with said unit disposed therein with each outer end part extending axially beyond said end walls, and wherein a lower portion of said unit and its gearing extending below said level, while said gearing connects said first and final gear to drive the final gear from the first gear, each said end part and said pad portion forming the mounting means for said mechanism and said unit by, having a surface normally parallel to the axis of the power takeoff for engaging a foundation and thereby preventing relative rotation of said unit upon operation of said motor, a first and a second aperture means, said first aperture means extending from the outer end of the end part of said first extension into said motor in the form of a conduit to seal the leadin wires to said motor from said fluid and, said outer end including fluid tight connecting means for coupling thereto of a conduit box, while said second aperture means extending from the outward end of the end part of said second extension into said inclosure and, said outward end including fluid tight connecting means for mounting thereon of a breather fitting, so as to form self-containment of said mechanism, and both said connecting means being disposed symmetrically relative to said mechanism.

3. The invention according to claim 2, wherein said power takeoff within said inclosure having a series of fluid lifters, said lifters being operably mounted onto the inner periphery of the power takeoff in spaced relationship to one another and disposed laterally opposite said motor frame and, wherein said lifters being cupshaped and having a pair of openings extending radially relative to the axis of the power takeoff, so that upon operation of said mechanism causes part of said fluid being lifted above said level and discharged directly onto an external upper surface of said frame, thereby causing substantially a continual fluid wetting of said surface by said part, and so forming a fluid means of heat conveyance from said surface to said housing by said confined fluid.

References Cited in the file of this patent

UNITED STATES PATENTS

| | | |
|---|---|---|
| 1,313,537 | Jones | Aug. 19, 1919 |
| 1,323,245 | Borkes | Dec. 2, 1919 |
| 1,614,031 | Holmes | Jan. 11, 1927 |
| 1,825,119 | Mug | Sept. 29, 1931 |
| 2,439,520 | Miller | Apr. 13, 1948 |
| 2,540,099 | Christian | Feb. 6, 1951 |

FOREIGN PATENTS

| | | |
|---|---|---|
| 474,336 | Germany | Mar. 30, 1929 |
| 609,915 | Germany | Nov. 15, 1931 |
| 615,792 | Germany | July 12, 1937 |